United States Patent
Andrieu et al.

(10) Patent No.: US 7,823,420 B2
(45) Date of Patent: Nov. 2, 2010

(54) TEXTILE PROTECTION ELEMENT FOR A PLASTIC SUPPORT

(75) Inventors: Hubert Andrieu, Crepy-en-Valois (FR); Emeline Andrieu, legal representative, Crepy-en-Valois (FR); Lionel Dromain, Crepy-en-Valois (FR); Gérard Mirmand, Roissy-en-Brie (FR); Christophe Brassenx, Cantigny (FR)

(73) Assignee: Federal Mogul Systems Protection, Crepy-en-Valois (FR)

( * ) Notice: Subject to any disclaimer, the term of this patent is extended or adjusted under 35 U.S.C. 154(b) by 135 days.

(21) Appl. No.: 11/665,328

(22) PCT Filed: Oct. 14, 2005

(86) PCT No.: PCT/FR2005/002552

§ 371 (c)(1),
(2), (4) Date: May 21, 2007

(87) PCT Pub. No.: WO2006/042946

PCT Pub. Date: Apr. 27, 2006

(65) Prior Publication Data

US 2008/0066499 A1    Mar. 20, 2008

(30) Foreign Application Priority Data

Oct. 15, 2004   (FR)   ................... 04 10956

(51) Int. Cl.
*D04B 1/22*   (2006.01)
(52) U.S. Cl. ........................................................ 66/170
(58) Field of Classification Search ................... 66/202, 66/195, 193
See application file for complete search history.

(56) References Cited

U.S. PATENT DOCUMENTS

| | | | |
|---|---|---|---|
| 3,669,157 A | | 6/1972 | Woodall et al. |
| 4,842,661 A | * | 6/1989 | Miller et al. .................. 156/88 |
| 5,178,923 A | * | 1/1993 | Andrieu et al. ............ 428/36.1 |
| 5,613,522 A | | 3/1997 | Ford et al. |
| 5,843,542 A | * | 12/1998 | Brushafer et al. .......... 428/36.1 |
| 5,889,229 A | * | 3/1999 | Sosnowski .................. 174/357 |
| 6,462,267 B1 | * | 10/2002 | Spies et al. .................. 174/358 |
| 6,588,237 B2 | * | 7/2003 | Cole et al. ..................... 66/202 |
| 6,978,643 B2 | * | 12/2005 | Akers et al. ................... 66/170 |
| 7,032,626 B2 | * | 4/2006 | Glenn et al. ............ 139/426 R |
| 7,347,229 B2 | * | 3/2008 | Glenn et al. ............ 139/387 R |
| 7,395,680 B2 | * | 7/2008 | Baer et al. ..................... 66/170 |
| 2002/0148258 A1 | * | 10/2002 | Cole et al. ..................... 66/202 |
| 2003/0034083 A1 | | 2/2003 | Glenn et al. |
| 2004/0112453 A1 | | 6/2004 | Bremard et al. |
| 2005/0124249 A1 | * | 6/2005 | Uribarri ...................... 442/304 |

FOREIGN PATENT DOCUMENTS

| | | |
|---|---|---|
| EP | 1371762 A1 | 12/2003 |
| EP | 1 394 311 | 3/2004 |
| RO | 113 874 | 11/1998 |
| WO | WO 03/042589 | 5/2003 |

* cited by examiner

*Primary Examiner*—Danny Worrell
(74) *Attorney, Agent, or Firm*—Young & Thompson

(57) ABSTRACT

The invention relates to a textile protection element (30) for a plastic support (33) of knitted embodiment, comprising at least one section (31, 32) with a thermosealing textile thread (2). The above is particularly of use for protection of a plastic hose.

18 Claims, 2 Drawing Sheets

TEXTILE PROTECTION ELEMENT FOR A PLASTIC SUPPORT

BACKGROUND OF THE INVENTION

1. Field of the Invention

Figure 1:
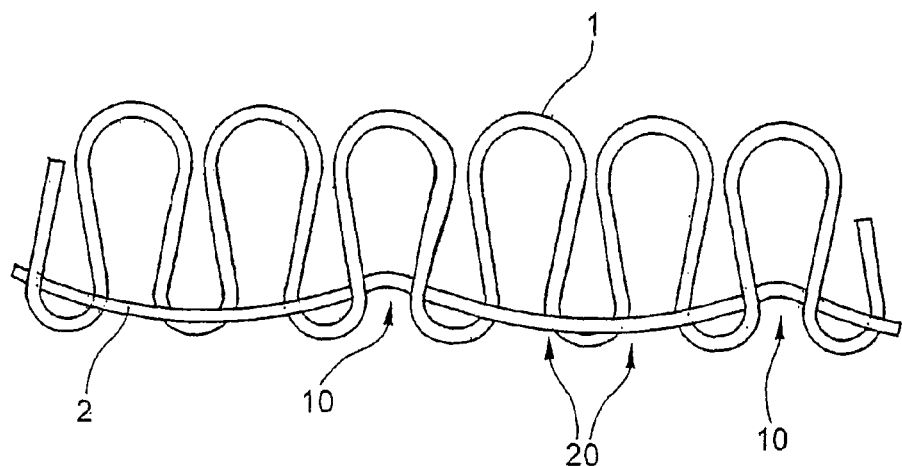

The present invention relates to a textile element for protecting a plastic support.

2. Description of the Related Art

It relates more particularly to a textile element intended to protect plastic pipes, of the polyamide pipe type, from abrasion.

This type of plastic pipe is used in particular in motor vehicles for transporting fuel from the tank to the engine.

In general, protective textile elements take the form of a textile sheath forming a sleeve around the plastic pipe. However, textile sheaths have a tendency to slide along their support, especially when the latter is made of polyamide, a particularly slippery material.

SUMMARY OF THE INVENTION

The present invention aims to solve the above problem and provides a protective textile element that can be immobilized on a plastic support.

For this purpose, the present invention relates to a textile element for protecting a plastic support.

According to the invention the textile is a knit and at least one portion of the textile element comprises a heat-bonding textile yarn.

Thanks to the use of a heat-bonding textile yarn, it is possible, by subjecting that portion of the textile element to the action of heat, to cause the heat-bonding yarn to melt and bond the portion of the textile element to the plastic support.

Thus, the textile element can be immobilized on the plastic support.

Furthermore, the knitted structure of the textile makes it possible, owing to its natural radial elasticity, for the textile to be applied perfectly on the plastic support and thus for effective bonding to be achieved when the textile yarn melts.

Preferably, the heat-bonding yarn melts at a temperature between 60 and 140° C. Furthermore, since the protective textile elements are generally exposed in use to temperatures of around 125-150° C., the heat-bonding yarn is preferably made of a thermosetting material, thus exhibiting good temperature behavior even when the textile element is raised to temperatures above the melting point of the heat-bonding yarn.

For example, the heat-bonding yarn is of the polyester and/or polyamide type, conventionally used in weaving to produce pieces of heat-bonding fabric for labels or welts.

Advantageously, the textile element takes the form of a tubular sheath, this being particularly well suited for protecting a plastic pipe.

To ensure that this tubular sheath bonds optimally, the heat-bonding yarn is preferably interlaced in the textile structure over at least one transverse portion of the tubular sheath. The heat-bonding portion of the textile element thus extends over a circular band of the tubular sheath.

In one particularly practical embodiment, the textile is a jersey knit or a rib knit.

Preferably, the heat-bonding yarn is a molleton yarn, allowing the heat-bonding yarn to be placed perfectly on one side of the knitted textile structure.

Other features and advantages of the invention will become clearer in the description below.

BRIEF DESCRIPTION OF THE DRAWING FIGURES

Figure 2:
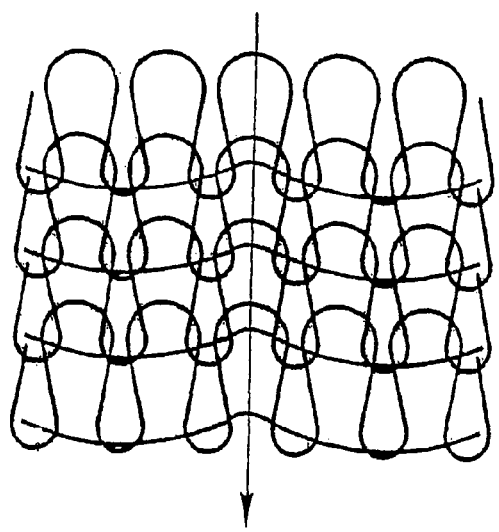
Figure 3:
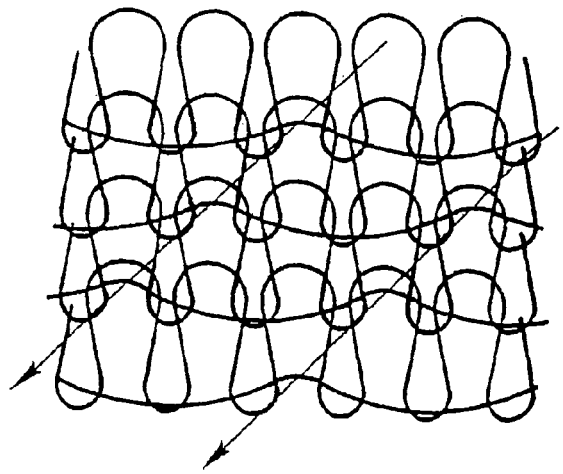
Figure 4:
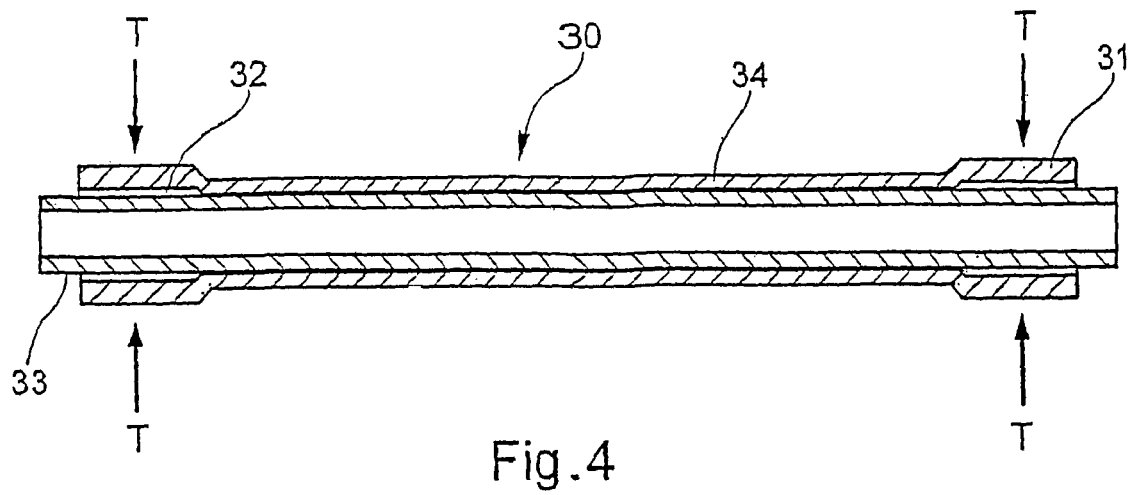
Figure 5:
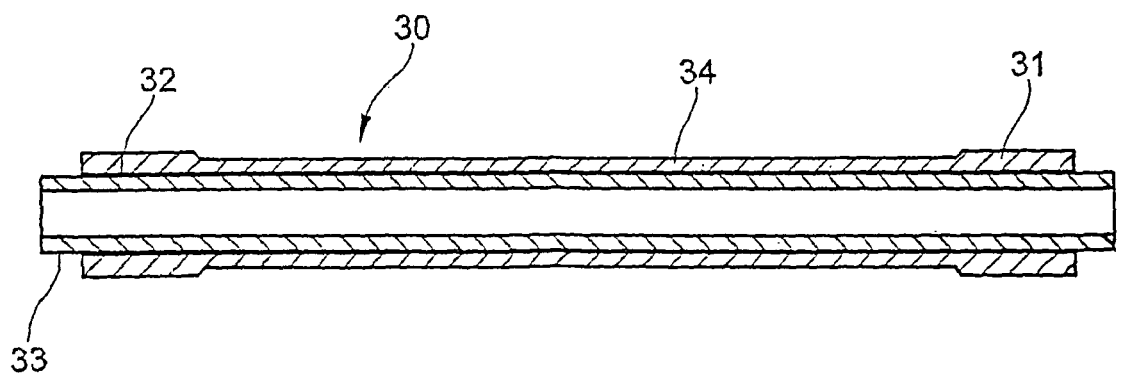

In the appended drawings, given as non-limiting examples:

FIGS. 1 to 3 illustrate schematically a knitted textile structure suitable for being used in the textile element according to one embodiment of the invention; and FIGS. 4 and 5 illustrate schematically, in longitudinal section, a textile sheath for protecting a plastic pipe, before and after bonding the sheath.

DETAILED DESCRIPTION OF THE INVENTION

One embodiment of the invention will now be described with reference to the figures.

In this example, the protective textile element is a tubular sheath.

Of course, this protective textile element could have any shape provided that it can be obtained by a knitting manufacturing process.

In this embodiment, the textile element providing mechanical protection is produced by knitting, of the jersey knit type.

Other types of knitting could be used, for example rib knitting.

By using a knitted structure it is possible to improve the effectiveness of the meltable yarn. This is because the knitted textile element has a certain radial elasticity, unlike for example a woven structure that has no radial elasticity. Thanks to this elasticity, the meltable yarn is held in contact with the plastic while this meltable yarn melts, thus improving the bonding and the fastening of the protective textile element to the plastic support.

Furthermore, knitting techniques make it possible, unlike a braided structure for example, to position most of the meltable yarn on the inside of the textile element, that is to say on the side intended to come into contact with the plastic support.

In this embodiment, the function of the textile sheath is to provide mechanical protection for a plastic support.

This textile sheath for mechanical protection must therefore have a number of characteristics owing to its application as mechanical protection.

When this sheath is intended to protect a fuel pipe in a motor vehicle, it must have good abrasion resistance, a temperature resistance of around 125 to 150° C., and good resistance to the automotive fluid, which is liable to migrate through the plastic pipe.

For this purpose, the textile sheath comprises polyester or polyamide monofilaments. The diameter of the monofilaments used in the textile structure is determined according to the desired mechanical properties for the textile element, and especially the desired abrasion resistance.

These polyester and polyamide monofilaments furthermore have the advantage of shrinking slightly when they are heated.

As will be explained later, this temperature shrinkage makes it easier to mount the tubular sheath on the plastic pipe and to immobilize it by bonding.

Moreover, when acoustic properties are also sought for the protective textile element, the textile sheath may furthermore include PET (polyethylene terephthalate) multifilaments.

According to the invention a heat-bonding textile yarn is also used over at least one portion of the textile sheath.

For example, it is possible to use heat-bonding yarns, commonly used in weaving to make labels, pieces of heat-bonding fabric, welts, etc.

Given that the plastic support on which the protective textile sheath is intended to be applied is generally made of a polyamide, it is preferable for the heat-bonding yarn to melt at a temperature between 60 and 140° C.

To give an example, it is possible to use a heat-bonding yarn made of a thermosetting material, of the polyester and/or polyamide type.

A heat-bonding yarn of the polyester/copolyamide type is for example sold under the name GRILON®.

Of course, other heat-bonding yarns may be used by assembling a heat-bonding yarn with a non-heat-bonding yarn in various proportions.

In particular, it is possible to use a yarn sold under the name FILIX® composed of:

6% elastane;
40.5% GRILON® heat-bonding yarn; and
53.5% textured polyamide.

The heat-bonding yarn is interlaced in the textile structure of the sheath over at least one transverse portion of the tubular sheath so that at least one annular portion of this sheath has a heat-bonding textile structure.

Preferably, when only one portion of the tubular sheath includes a heat-bonding textile yarn, a heat-bonding yarn of the FILIX® type is used.

This FILIX® yarn comprises only 50% of meltable material, so that the other components of FILIX® do not melt at the temperatures used. Thus, after bonding, a certain mechanical strength is retained and the FILIX® yarn may be knitted on its own for a portion of the sheath.

However, when the tubular sheath comprises a heat-bonding textile yarn over its entire length, it is advantageous to use a heat-bonding yarn of the GRILON® type.

This GRILON® yarn is entirely meltable. Consequently, it must be knitted at the same time as another, non-meltable yarn.

In this embodiment, the textile used by the tubular sheath is a jersey knit. In order to add a heat-bonding textile yarn into the textile structure knitted from polyester or polyamide monofilaments, and possibly multifilaments, several knitting techniques may be used.

In particular when the heat-bonding textile yarn extends over the entire length of the sheath, the heat-bonding yarn is a molleton yarn. The heat-bonding yarn is used in circular knitting, inserted right through it, and does not mesh with the knitted textile structure.

An example of molleton is described in FIGS. 1 to 3.

In these examples, the monofilament used for knitting the textile structure bears the reference 1 and the heat-bonding textile yarn bears the reference 2.

This a 1/2 molleton in which there is an alternation of one interlocked stitch 10 and two float stitches 20.

A jersey circular knitting process has the advantage of obtaining a seamless tubular product. The molleton yarn principle allows ideal deposition of the heat-bonding yarn inside the textile sheath.

In the illustrative embodiment, the molleton float is produced on two needles. Of course, it could also be produced on one or three needles. These are then referred to as a 1/1 or 1/3 molleton.

This molleton float process makes it possible to make a substantial saving of heat-bonding yarn used in the textile structure.

Various types of two-needle float are illustrated in FIGS. 2 and 3. In FIG. 2, the interlocked stitch is always produced on the same needle, whereas in FIG. 3 the interlocked stitch is shifted by one needle on each course of the knit. Preferably, the latter method of knitting, called two-needle float, is used in "diamond" fashion, allowing the visible surface of the heat-bonding yarn to be distributed over the inside of the textile sheath.

Of course, other processes could be used, of the plating type, allowing the fabric to be obtained with two different sides, each with one type of yarn, for example one side with a heat-bonding yarn and the other side with a monofilament.

Preferably, the gauge of the knitting machine cylinder, the needles and the closeness setting will be chosen so as to obtain a dense loop structure.

A dense knitted structure provides better abrasion resistance and a relatively rigid cylindrical sheath, thus making it easier to fit it onto a cylindrical pipe.

Furthermore, it is advantageous to knit a textile sheath with a diameter slightly greater than that of the plastic support so as to make it easier to fit the sheath onto its support.

This type of knitted sheath exhibits little longitudinal elasticity, while still containing a slight diametral expansion capability.

Other types of knitting may be used to produce a tubular sheath, in particular when only one or both end portions of the tubular sheath comprise a heat-bonding textile yarn.

It is then possible to use a circular jersey knitting process using a striper, allowing the knitted yarn to be automatically changed.

In practice, a certain length corresponding to a first end portion of the tubular sheath is knitted in a monofilament heat-bonding yarn of the polyester or polyamide type.

This first portion is followed by a length of jersey knit produced only from monofilaments, and possibly from multifilaments, in order to obtain a tubular sheath having mechanical protection properties.

This length of sheath is itself followed again by a length of jersey knit using a heat-bonding yarn along a portion that may correspond either to the first end of a second tubular sheath to be knitted, or to the second end of the first tubular sheath already knitted. A single portion using a heat-bonding yarn may be knitted so as thereafter to form, after the knitted sheath has been cut at this portion, both the second end of a first tubular sheath and the first end of a second tubular sheath.

This knitting process is most particularly valid for long sheaths, since the change of yarn for producing each of the portions requires the knitting machine to be stopped.

However, compared with the first process described, employing a molleton knit, this second knitting method makes it possible to achieve a not insignificant saving of heat-bonding yarn.

Or course, only illustrative examples of a sheath using circular knitting machines have been described here.

However, the tubular sheath could also be produced flat and then closed up by a seam along its longitudinal edges.

Furthermore, the invention is not limited to the production of a tubular sheath but may also apply to any other type of textile structure for mechanical protection.

An example of the use of a textile tubular sheath according to the invention will be described with reference to FIGS. 4 and 5.

In this embodiment, the textile sheath 30 is of tubular form, including two end portions 31, 32 produced from a heat-bonding textile yarn either using a molleton yarn or knitting the heat-bonding yarn using a tubular jersey process or a rib knitting process.

As already explained above, to make it easier to fit the sheath 30 onto a plastic pipe 33, the inside diameter of the sheath 30 is slightly greater than the outside diameter of the pipe 33.

Thanks to the action of the heat, illustrated by the arrows T in FIG. 5 at the end portion 31, 32 of the sheath 30, the heat-bonding yarn melts so as to allow it to bond onto the plastic pipe 33.

Preferably, the monofilaments chosen exhibit a slight shrinkage with temperature during the bonding process. The monofilaments used in the end portions 31, 32 shrink in such a way that sufficient pressure is applied by the tubular sheath 30 on the plastic pipe 33, making it easier for bonding to take place.

This shrinkage effect is illustrated in FIGS. 4 and 5, with the shrinkage of the end portions 31, 32 being exaggerated compared within the main central portion 34 of the tubular sheath, so as to make it easier to understand the invention.

Preferably, the heat-bonding yarns used have a color that changes when the yarn melts in such a way that the operator carrying out the bonding operation can see with the naked eye that the heat-bonding yarn has melted and that the tubular sheath has bonded properly to the plastic support.

For example, the heat-bonding yarn may be white and becomes black or transparent after melting.

A textile sheath is thus obtained that can be immobilized on a plastic pipe of the type made of a relatively slippery polyamide.

Furthermore, when the tubular sheath according to the invention is used in a pipe conveying fuel between a tank and the engine of a motor vehicle, the operation of bonding the protective textile sheath may be incorporated during a pipe-forming cycle.

Of course, many modifications may be made to the exemplary embodiments described above without departing from the scope of the invention.

In particular, the tubular sheath could include only a single portion comprising a heat-bonding textile yarn, for example at one of its ends, or possibly in the middle of the sheath.

The textile sheath could also perform a thermal protection role.

The invention claimed is:

1. A tubular textile sheath configured to protect a plastic tube, comprising:
a textile structure that is a knit, said textile structure including at least one of polyester or polyamide heat-shrinkable monofilaments, at least one portion of the tubular textile sheath comprising a heat-bonding textile yarn interlaced in said textile structure, said at least one portion of the tubular textile sheath being bonded by said heat-bonding textile yarn onto said plastic tube, and an inside diameter of said tubular textile sheath being slightly greater than an outside diameter of said plastic tube, before bonding said tubular textile sheath onto said plastic tube.

2. The tubular textile sheath as claimed in claim 1, wherein the heat-bonding textile yarn melts at a temperature between 60° C. and 140° C.

3. The tubular textile sheath as claimed in claim 1, wherein the heat-bonding textile yarn is made of a thermosetting material.

4. The tubular textile sheath as claimed in claim 1, wherein the heat-bonding textile yarn is a polyester and/or a polyamide.

5. The tubular textile sheath as claimed in claim 1, wherein the tubular textile sheath further includes multifilaments.

6. The tubular textile sheath as claimed in claim 1, wherein said portion comprising the heat-bonding textile yarn constitutes one end of the tubular sheath.

7. The tubular textile sheath as claimed in claim 1, wherein the two end portions of the tubular textile sheath comprise the heat-bonding textile yarn.

8. The tubular textile sheath as claimed in claim 1, wherein the tubular textile sheath further comprises the heat-bonding textile yarn over an entire length of the tubular textile sheath.

9. The tubular textile sheath as claimed in claim 1, wherein the textile is a jersey knit.

10. The tubular textile sheath as claimed in claim 1, wherein the textile is a rib knit.

11. The tubular textile sheath as claimed in claim 1, wherein the heat-bonding yarn is a molleton yarn in the knitted textile.

12. The tubular textile sheath as claimed in claim 1, wherein the heat-bonding yarn is knitted with the textile over at least one portion of the tubular textile sheath.

13. The tubular textile sheath as claimed in claim 2, wherein the heat-bonding yarn is made of a thermosetting material.

14. The tubular textile sheath as claimed in claim 2, wherein the heat-bonding yarn is formed from polyester and/or polyamide.

15. The tubular textile sheath as claimed in claim 2, wherein the tubular textile sheath further includes multifilaments.

16. The tubular textile sheath as claimed in claim 1, wherein most of the heat-bonding textile yarn is positioned on an inside of the tubular textile sheath.

17. The tubular textile sheath as claimed in claim 1, wherein said heat-bonding textile yarn is interlaced with said monofilaments.

18. An assembly, comprising:
a plastic tube; and
a tubular textile sheath protecting the plastic tube, the tubular textile sheath comprising a textile structure that is a knit, said textile structure including at least one of polyester or polyamide heat-shrinkable monofilaments, at least one portion of the tubular textile sheath comprising a heat-bonding textile yarn interlaced in said textile structure, said at least one portion of the tubular textile sheath being bonded by said heat-bonding textile yarn onto said plastic support tube, and an inside diameter of said tubular textile sheath being slightly greater than an outside diameter of said plastic tube, before bonding said tubular textile sheath onto said plastic tube.

* * * * *